(12) United States Patent
Weinraub

(10) Patent No.: US 10,254,840 B2
(45) Date of Patent: Apr. 9, 2019

(54) GUIDANCE DEVICE FOR THE SENSORY IMPAIRED

(71) Applicant: Apple Inc., Cupertino, CA (US)

(72) Inventor: Chananiel Weinraub, Herzeliya Pituah (IL)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/900,728

(22) Filed: Feb. 20, 2018

(65) Prior Publication Data

US 2018/0181204 A1 Jun. 28, 2018

Related U.S. Application Data

(63) Continuation of application No. 14/804,930, filed on Jul. 21, 2015, now abandoned.

(51) Int. Cl.
*G06F 3/01* (2006.01)
*G06F 3/16* (2006.01)
(Continued)

(52) U.S. Cl.
CPC .............. *G06F 3/016* (2013.01); *G01C 21/20* (2013.01); *G06F 3/167* (2013.01); *G06K 9/00671* (2013.01)

(58) Field of Classification Search
CPC ..... G06F 3/016; G06F 3/167; G06K 9/00671; G01C 21/20
See application file for complete search history.

(56) References Cited

U.S. PATENT DOCUMENTS

| 5,196,745 A | 3/1993 | Trumper et al. |
| 5,293,161 A | 3/1994 | MacDonald et al. |

(Continued)

FOREIGN PATENT DOCUMENTS

| CN | 101036105 | 9/2007 |
| CN | 101409164 | 4/2009 |

(Continued)

OTHER PUBLICATIONS

Hasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.

(Continued)

*Primary Examiner* — Richard M Camby
(74) *Attorney, Agent, or Firm* — Dorsey & Whitney LLP

(57) ABSTRACT

Sensor data is obtained regarding an environment around a guidance device. A model of the environment is generated based on the data. The model is mapped at least to an input/output touch surface of the guidance device. Tactile output is provided to a user of the guidance device via the input/output touch surface based at least on the mapping. Other output based on the model may also be provided. The guidance device may include a variety of different components such as sensors that obtain data regarding the environment, input/output mechanisms for receiving input from and/or providing input to the user, processing units and/or other components for generating the model and/or mapping the model to various input/output mechanisms, and so on. Additionally, the guidance device may cooperate and/or communicate with a variety of different electronic devices that have one or more such components in order to perform such functions.

19 Claims, 11 Drawing Sheets

(51) Int. Cl.
*G06K 9/00* (2006.01)
*G01C 21/20* (2006.01)

(56) References Cited

U.S. PATENT DOCUMENTS

| | | |
|---|---|---|
| 5,424,756 A | 6/1995 | Ho et al. |
| 5,434,549 A | 7/1995 | Hirabayashi et al. |
| 5,436,622 A | 7/1995 | Gutman et al. |
| 5,668,423 A | 9/1997 | You et al. |
| 5,739,759 A | 4/1998 | Nakazawa et al. |
| 6,084,319 A | 7/2000 | Kamata et al. |
| 6,342,880 B2 | 1/2002 | Rosenberg et al. |
| 6,373,465 B2 | 4/2002 | Jolly et al. |
| 6,388,789 B1 | 5/2002 | Bernstein |
| 6,438,393 B1 | 8/2002 | Surronen |
| 6,445,093 B1 | 9/2002 | Binnard |
| 6,493,612 B1 | 12/2002 | Bisset et al. |
| 6,693,622 B1 | 2/2004 | Shahoian et al. |
| 6,777,895 B2 | 8/2004 | Shimoda et al. |
| 6,822,635 B2 | 11/2004 | Shahoian |
| 6,864,877 B2 | 3/2005 | Braun et al. |
| 6,952,203 B2 | 10/2005 | Banerjee et al. |
| 6,988,414 B2 | 1/2006 | Ruhrig et al. |
| 7,068,168 B2 | 6/2006 | Girshovich et al. |
| 7,080,271 B2 | 7/2006 | Kardach et al. |
| 7,130,664 B1 | 10/2006 | Williams |
| 7,202,851 B2 | 4/2007 | Cunningham et al. |
| 7,234,379 B2 | 6/2007 | Claesson et al. |
| 7,253,350 B2 | 8/2007 | Noro et al. |
| 7,276,907 B2 | 10/2007 | Kitagawa et al. |
| 7,323,959 B2 | 1/2008 | Naka et al. |
| 7,339,572 B2 | 3/2008 | Schena |
| 7,355,305 B2 | 4/2008 | Nakamura et al. |
| 7,370,289 B1 | 5/2008 | Ebert et al. |
| 7,392,066 B2 | 6/2008 | Hapamas |
| 7,423,631 B2 | 9/2008 | Shahoian et al. |
| 7,508,382 B2 | 3/2009 | Denoue et al. |
| 7,570,254 B2 | 8/2009 | Suzuki et al. |
| 7,656,388 B2 | 2/2010 | Schena et al. |
| 7,667,371 B2 | 2/2010 | Sadler et al. |
| 7,667,691 B2 | 2/2010 | Boss et al. |
| 7,675,414 B2 | 3/2010 | Ray |
| 7,710,397 B2 | 5/2010 | Krah et al. |
| 7,710,399 B2 | 5/2010 | Bruneau et al. |
| 7,741,938 B2 | 6/2010 | Kramlich |
| 7,755,605 B2 | 7/2010 | Daniel et al. |
| 7,798,982 B2 | 9/2010 | Zets et al. |
| 7,825,903 B2 | 11/2010 | Anastas et al. |
| 7,855,657 B2 | 12/2010 | Doemens et al. |
| 7,890,863 B2 | 2/2011 | Grant et al. |
| 7,893,922 B2 | 2/2011 | Klinghult et al. |
| 7,904,210 B2 | 3/2011 | Pfau et al. |
| 7,911,328 B2 | 3/2011 | Luden et al. |
| 7,919,945 B2 | 4/2011 | Houston et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,976,230 B2 | 7/2011 | Ryynanen et al. |
| 8,002,089 B2 | 8/2011 | Jasso et al. |
| 8,040,224 B2 | 10/2011 | Hwang |
| 8,053,688 B2 | 11/2011 | Conzola et al. |
| 8,063,892 B2 | 11/2011 | Shahoian |
| 8,081,156 B2 | 12/2011 | Ruettiger |
| 8,125,453 B2 | 2/2012 | Shahoian et al. |
| 8,154,537 B2 | 4/2012 | Olien et al. |
| 8,174,495 B2 | 5/2012 | Takashima et al. |
| 8,174,512 B2 | 5/2012 | Ramstein et al. |
| 8,169,402 B2 | 6/2012 | Shahoian et al. |
| 8,217,892 B2 | 7/2012 | Meadors |
| 8,232,494 B2 | 7/2012 | Purcocks |
| 8,248,386 B2 | 8/2012 | Harrison |
| 8,253,686 B2 | 8/2012 | Kyung |
| 8,262,480 B2 | 9/2012 | Cohen et al. |
| 8,265,292 B2 | 9/2012 | Leichter |
| 8,265,308 B2 | 9/2012 | Gitzinger et al. |
| 8,344,834 B2 | 1/2013 | Niiyama |
| 8,345,025 B2 | 1/2013 | Seibert et al. |
| 8,351,104 B2 | 1/2013 | Zaifrani et al. |
| 8,378,797 B2 | 2/2013 | Pance et al. |
| 8,378,965 B2 | 2/2013 | Gregorio et al. |
| 8,384,316 B2 | 2/2013 | Houston et al. |
| 8,390,218 B2 | 3/2013 | Houston et al. |
| 8,390,594 B2 | 3/2013 | Modarres et al. |
| 8,400,027 B2 | 3/2013 | Dong et al. |
| 8,405,618 B2 | 3/2013 | Colgate et al. |
| 8,469,806 B2 | 6/2013 | Grant et al. |
| 8,471,690 B2 | 6/2013 | Hennig et al. |
| 8,493,177 B2 | 7/2013 | Flaherty et al. |
| 8,493,189 B2 | 7/2013 | Suzuki |
| 8,576,171 B2 | 11/2013 | Grant |
| 8,598,750 B2 | 12/2013 | Park |
| 8,598,972 B2 | 12/2013 | Cho et al. |
| 8,605,141 B2 | 12/2013 | Dialameh et al. |
| 8,614,431 B2 | 12/2013 | Huppi et al. |
| 8,619,031 B2 | 12/2013 | Hayward |
| 8,624,448 B2 | 1/2014 | Kaiser et al. |
| 8,633,916 B2 | 1/2014 | Bernstein et al. |
| 8,639,485 B2 | 1/2014 | Connacher et al. |
| 8,648,829 B2 | 2/2014 | Shahoian et al. |
| 8,681,130 B2 | 3/2014 | Adhikari |
| 8,717,151 B2 | 5/2014 | Forutanpour et al. |
| 8,730,182 B2 | 5/2014 | Modarres et al. |
| 8,749,495 B2 | 6/2014 | Grant et al. |
| 8,754,759 B2 | 6/2014 | Fadell et al. |
| 8,760,037 B2 | 6/2014 | Eshed et al. |
| 8,773,247 B2 | 7/2014 | Ullrich |
| 8,797,153 B2 | 8/2014 | Vanhelle et al. |
| 8,803,670 B2 | 8/2014 | Steckel et al. |
| 8,834,390 B2 | 9/2014 | Couvillon |
| 8,836,502 B2 | 9/2014 | Culbert et al. |
| 8,867,757 B1 | 10/2014 | Ooi |
| 8,872,448 B2 | 10/2014 | Boldyrev et al. |
| 8,878,401 B2 | 11/2014 | Lee |
| 8,907,661 B2 | 12/2014 | Maier et al. |
| 8,976,139 B2 | 3/2015 | Koga et al. |
| 8,981,682 B2 | 3/2015 | Delson et al. |
| 8,987,951 B2 | 3/2015 | Park |
| 9,008,730 B2 | 4/2015 | Kim et al. |
| 9,024,738 B2 | 5/2015 | Van Schyndel et al. |
| 9,054,605 B2 | 6/2015 | Jung et al. |
| 9,058,077 B2 | 6/2015 | Lazaridis et al. |
| 9,086,727 B2 | 7/2015 | Tidemand et al. |
| 9,104,285 B2 | 8/2015 | Colgate et al. |
| 9,122,330 B2 | 9/2015 | Bau et al. |
| 9,134,796 B2 | 9/2015 | Lemmons et al. |
| 9,172,669 B2 | 10/2015 | Swink et al. |
| 9,218,727 B2 | 12/2015 | Rothkopf et al. |
| 9,256,287 B2 | 2/2016 | Shinozaki et al. |
| 9,274,601 B2 | 3/2016 | Faubert et al. |
| 9,280,205 B2 | 3/2016 | Rosenberg et al. |
| 9,286,907 B2 | 3/2016 | Yang et al. |
| 9,304,587 B2 | 4/2016 | Wright et al. |
| 9,361,018 B2 | 6/2016 | Pasquero et al. |
| 9,396,629 B1 | 7/2016 | Weber et al. |
| 9,430,042 B2 | 8/2016 | Levin |
| 9,436,280 B2 | 9/2016 | Tartz et al. |
| 9,442,570 B2 | 9/2016 | Slonneger |
| 9,448,713 B2 | 9/2016 | Cruz-Hernandez et al. |
| 9,449,476 B2 | 9/2016 | Lynn et al. |
| 9,466,783 B2 | 10/2016 | Olien et al. |
| 9,489,049 B2 | 11/2016 | Li |
| 9,496,777 B2 | 11/2016 | Jung |
| 9,501,149 B2 | 11/2016 | Burnbaum et al. |
| 9,513,704 B2 | 12/2016 | Heubel et al. |
| 9,535,500 B2 | 1/2017 | Pasquero et al. |
| 9,539,164 B2 | 1/2017 | Sanders et al. |
| 9,557,830 B2 | 1/2017 | Grant |
| 9,600,037 B2 | 3/2017 | Pance et al. |
| 9,600,071 B2 | 3/2017 | Rothkopf |
| 9,632,583 B2 | 4/2017 | Virtanen et al. |
| 9,710,061 B2 | 7/2017 | Pance et al. |
| 9,829,981 B1 | 11/2017 | Ji |
| 9,927,902 B2 | 3/2018 | Burr et al. |
| 9,940,013 B2 | 4/2018 | Choi et al. |

(56) References Cited

U.S. PATENT DOCUMENTS

| | | |
|---|---|---|
| 2003/0117132 A1 | 6/2003 | Klinghult |
| 2005/0036603 A1 | 2/2005 | Hughes |
| 2005/0230594 A1 | 10/2005 | Sato et al. |
| 2006/0017691 A1 | 1/2006 | Cruz-Hernandez et al. |
| 2006/0209037 A1 | 9/2006 | Wang et al. |
| 2006/0223547 A1 | 10/2006 | Chin et al. |
| 2006/0252463 A1 | 11/2006 | Liao |
| 2007/0106457 A1 | 5/2007 | Rosenberg |
| 2007/0152974 A1 | 7/2007 | Kim et al. |
| 2008/0062145 A1 | 3/2008 | Shahoian |
| 2008/0084384 A1 | 4/2008 | Gregorio et al. |
| 2008/0111791 A1 | 5/2008 | Nikittin |
| 2009/0085879 A1 | 4/2009 | Dai et al. |
| 2009/0115734 A1 | 5/2009 | Fredriksson et al. |
| 2009/0166098 A1 | 7/2009 | Sunder |
| 2009/0167702 A1 | 7/2009 | Nurmi |
| 2009/0167704 A1 | 7/2009 | Terlizzi et al. |
| 2009/0174672 A1 | 7/2009 | Schmidt |
| 2009/0207129 A1 | 8/2009 | Ullrich et al. |
| 2009/0225046 A1 | 9/2009 | Kim et al. |
| 2009/0243404 A1 | 10/2009 | Kim et al. |
| 2009/0267892 A1 | 10/2009 | Faubert |
| 2009/0313542 A1 | 12/2009 | Cruz-Hernandez et al. |
| 2010/0116629 A1 | 5/2010 | Borissov et al. |
| 2010/0225600 A1 | 9/2010 | Dai et al. |
| 2010/0313425 A1 | 12/2010 | Hawes |
| 2010/0328229 A1 | 12/2010 | Weber et al. |
| 2011/0115754 A1 | 5/2011 | Cruz-Hernandez |
| 2011/0128239 A1 | 6/2011 | Polyakov et al. |
| 2011/0132114 A1 | 6/2011 | Siotis |
| 2011/0205038 A1 | 8/2011 | Drouin et al. |
| 2012/0056825 A1 | 3/2012 | Ramsay et al. |
| 2012/0062491 A1 | 3/2012 | Coni et al. |
| 2012/0127071 A1 | 5/2012 | Jitkoff et al. |
| 2012/0127088 A1 | 5/2012 | Pance et al. |
| 2012/0235942 A1 | 9/2012 | Shahoian |
| 2012/0327006 A1 | 12/2012 | Israr et al. |
| 2013/0016042 A1 | 1/2013 | Makinen et al. |
| 2013/0044049 A1 | 2/2013 | Biggs et al. |
| 2013/0207793 A1 | 8/2013 | Weaber et al. |
| 2013/0278401 A1 | 10/2013 | Flaherty et al. |
| 2014/0125470 A1 | 5/2014 | Rosenberg |
| 2015/0097800 A1 | 4/2015 | Grant et al. |
| 2015/0116205 A1 | 4/2015 | Westerman et al. |
| 2015/0126070 A1 | 5/2015 | Candelore |
| 2015/0130730 A1 | 5/2015 | Harley et al. |
| 2015/0135121 A1 | 5/2015 | Peh et al. |
| 2015/0277562 A1 | 5/2015 | Bard et al. |
| 2015/0234493 A1 | 8/2015 | Parivar et al. |
| 2015/0338919 A1 | 11/2015 | Weber et al. |
| 2015/0349619 A1 | 12/2015 | Degner et al. |
| 2016/0011664 A1 | 1/2016 | Silvanto et al. |
| 2016/0170508 A1* | 6/2016 | Moore ................ G09B 21/003 345/173 |
| 2016/0171767 A1 | 6/2016 | Anderson et al. |
| 2016/0209979 A1 | 7/2016 | Endo et al. |
| 2016/0328930 A1 | 11/2016 | Weber et al. |
| 2017/0003744 A1 | 1/2017 | Bard et al. |
| 2017/0024010 A1 | 1/2017 | Weinraub |
| 2017/0249024 A1 | 8/2017 | Jackson et al. |

FOREIGN PATENT DOCUMENTS

| | | |
|---|---|---|
| CN | 101663104 | 3/2010 |
| CN | 101872257 | 10/2010 |
| EP | 1686776 | 8/2006 |
| EP | 2743798 | 6/2014 |
| JP | 2004129120 | 4/2004 |
| JP | 2004236202 | 8/2004 |
| JP | 2010537279 | 12/2010 |
| JP | 2010540320 | 12/2010 |
| KR | 20050033909 | 4/2005 |
| TW | 2010035805 | 10/2010 |
| WO | WO2002/073587 | 9/2002 |
| WO | WO2006/091494 | 8/2006 |
| WO | WO2007/049253 | 5/2007 |
| WO | WO2007/114631 | 10/2007 |
| WO | WO2009/038862 | 3/2009 |
| WO | WO2010/129892 | 11/2010 |
| WO | WO2013/169303 | 11/2013 |
| WO | WO2014/066516 | 5/2014 |

OTHER PUBLICATIONS

Hill et al., "Real-time Estimation of Human Impedance for Haptic Interfaces," Stanford Telerobotics Laboratory, Department of Mechanical Engineering, Standford University, 6 pages, at least as early as Sep. 30, 2009.

Lee et al, "Haptic Pen: Tactile Feedback Stylus for Touch Screens," Mitsubishi Electric Research Laboratories, http://wwwlmerl.com, 6 pages, Oct. 2004.

* cited by examiner

GUIDANCE DEVICE FOR THE SENSORY IMPAIRED

CROSS-REFERENCE TO RELATED APPLICATION(S)

This application is a continuation patent application of U.S. patent application Ser. No. 14/804,930, filed Jul. 21, 2015 and titled "Guidance Device for the Sensory Impaired," the disclosure of which is hereby incorporated herein by reference in its entirety.

FIELD

The described embodiments relate generally to guidance devices. More particularly, the present embodiments relate to guidance devices for the sensory impaired.

BACKGROUND

People use a variety of senses to navigate and interact with the various environments they encounter on a daily basis. For example, people use their senses of sight and sound to navigate in their homes, on the street, through workplaces and shopping centers, and so on. Such environments may be designed and configured under the assumption that people will be able to use senses such as sight and sound for navigation.

However, many people are sensory impaired in one way or another. People may be deaf or at least partially auditorily impaired, blind or at least partially visually impaired, and so on. By way of example, the World Health Organization estimated in April of 2012 that 285 million people were visually impaired. Of these 285 million people, 246 million were estimated as having low vision and 39 million were estimated to be blind. Navigation through environments designed and configured for those lacking sensory impairment may be challenging or difficult for the sensory impaired.

Some sensory impaired people use guidance devices or relationships to assist them in navigating and interacting with their environments. For example, some blind people may use a cane in order to navigate and interact with an environment. Others may use a guide animal.

SUMMARY

The present disclosure relates to guidance devices for sensory impaired users. Sensor data may be obtained regarding an environment. A model of the environment may be generated and the model may be mapped at least to an input/output touch surface. Tactile output and/or other output may be provided to a user based at least on the mapping. In this way, a sensory impaired user may be able to navigate and/or interact with an environment utilizing the guidance device.

In various embodiments, a guidance device for a sensory impaired user may include an input/output touch surface, a sensor data component that obtains data regarding an environment around the guidance device, and a processing unit coupled to the input/output touch surface and the sensor data component. The processing unit may generate a model of the environment based at least on the data, map the model to the input/output touch surface and provide tactile output to a user based at least on the mapping via the input/output touch surface.

In some examples, the tactile output may be an arrangement of raised portions of the input/output touch surface or other tactile feedback configured to produce a tactile sensation of bumps.

In various examples, the tactile output may include a representation of an object in the environment and a region of the input/output touch surface where the representation is provided may correspond to positional information regarding the object. The positional information regarding the object corresponding to the region may be first positional information when the tactile output includes a first positional information context indicator and second positional information when the tactile output includes a second positional information context indicator. The shape of the representation may be associated with a detected shape of the object.

In some examples, the sensor data component may receive at least a portion of the data from another electronic device.

In various examples, the processing unit may provide at least one audio notification based at least on the model via an audio component of the guidance device or another electronic device.

In some embodiments, an assistance device for a sensory impaired user may include a surface operable to detect touch and provide tactile output, a sensor that detects information about an environment, and a processing unit coupled to the surface and the sensor. The processing unit may determine a portion of the surface being touched, select a subset of the information for output, and provide the tactile output to a user corresponding to the subset of the information via the portion of the surface.

In some examples, the sensor may detect orientation information regarding the assistance device and the processing unit may provide the tactile output via the portion of the surface according to the orientation information. In various examples, the sensor may detect location information regarding the assistance device and the tactile output may include a direction indication associated with navigation to a destination.

In some examples, the tactile output may include an indication of a height of an object in the environment. In various examples, the tactile output may include an indication that the object is traveling in a course that will connect with a user (which may be determined using real time calculations). In some examples, the tactile output may include an indication that the user is approaching the object and the object is below a head height of the user.

In various examples, the tactile output may include a first representation of a first object located in a direction of travel of the assistance device and a second representation of a second object located in an opposite direction of the direction of travel. In some examples, the wherein the tactile output may include a representation of an object in the environment and a texture of the representation may be associated with a detected texture of the object. In various examples, regions of the portion of the surface where the first representation and the second representation are provided may indicate that the first object is located in the direction of travel and the second object is located in the opposite direction of the direction of travel.

In some examples, the processing unit may provide an audio notification via an audio component upon determining that the assistance device experiences a fall event during use.

In various embodiments, an environmental exploration device may include a cylindrical housing, a processing unit located within the cylindrical housing, a touch sensing device coupled to the processing unit and positioned over the cylindrical housing, a haptic device (such as one or more piezoelectric cells) coupled to the processing unit and positioned adjacent to the touch sensing device, and an image sensor coupled to the processing unit that detects image data about an area around the cylindrical housing. The processing unit may analyze the image data using image recognition to identify an object (and/or analyze data from one or more depth sensors to determine distance to and/or speed of moving objects), creates an output image representing the object and positional information regarding the object in the area, map the output image to the haptic device; and provide the output image as tactile output to a user via the haptic device.

In some examples, the processing unit may provide an audio description of the object and the positional information via an audio component. In various examples, the processing unit may determine details of a hand of the user that is touching the touch sensing device and map the output image to the haptic device in accordance with whether the hand is a left hand of the user, a right hand of the user, has a large palm size, has a small palm size, has less than four fingers, or does not have a thumb.

In various examples, the environmental exploration device may also include a weight component coupled to the cylindrical housing operable to alter an orientation of the environmental exploration device.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments described herein may permit a sensory-impaired user to quickly and efficiently interact with his or her environment. Sensory-impaired users may use a device which provides guidance to the user that communicate information about the environment to aid the user's interaction therewith. The device may detect information about the environment, model the environment based on the information, and present guidance output based on the model in a fashion detectable by the user. Such guidance output may be tactile so the user can quickly and efficiently "feel" the guidance output while interacting with the environment. This device may enable the sensory-impaired user to more quickly and efficiently interact with his or her environment than is possible with existing sensory-impaired guidance devices such as canes.

The present disclosure relates to guidance devices for sensory impaired users. Sensor data may be obtained regarding an environment around a guidance device, assistance device, environmental exploration device, an/or other such device. A model of the environment may be generated based on the data. The model may be mapped at least to an input/output touch surface of the guidance device. Tactile output may be provided to a user of the guidance device via the input/output touch surface based at least on the mapping. Other output based on the model may also be provided. In this way, a sensory impaired user may be able to navigate and/or interact with an environment utilizing the guidance device. Such a guidance device may provide better assistance than and/or take the place of a cane, a guidance animal, and/or other guidance devices and/or relationships.

The guidance device may include a variety of different components such as sensors that obtain data regarding the environment, input/output mechanisms for receiving input from and/or providing input to the user, processing units and/or other components for generating the model and/or mapping the model to various input/output mechanisms, and so on. Additionally, the guidance device may cooperate and/or communicate with a variety of different electronic devices that have one or more such components in order to perform one or more of these functions.

These and other embodiments are discussed below with reference to FIGS. 1-10. However, those skilled in the art will readily appreciate that the detailed description given herein with respect to these Figures is for explanatory purposes only and should not be construed as limiting.

Figure 1:
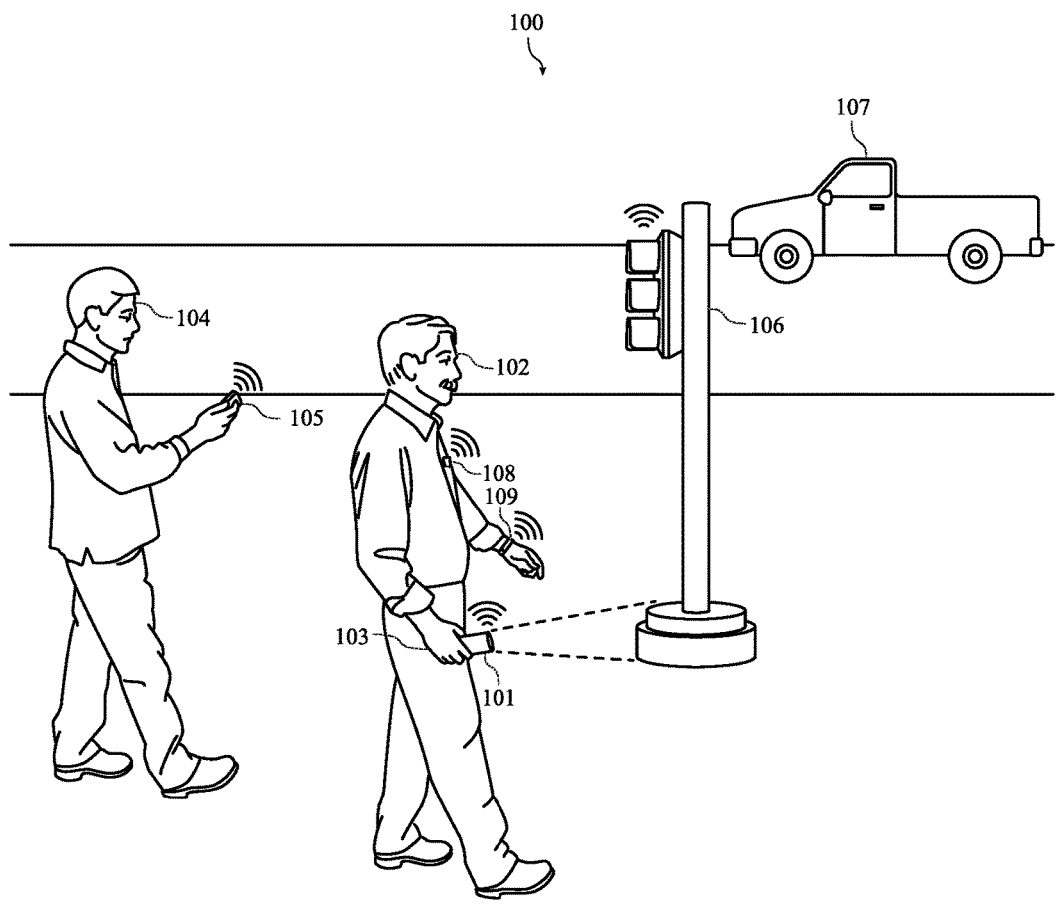
FIG. 1 shows a user navigating an example environment using a guidance device.

FIG. 1 shows a user 102 navigating an example environment 100 using a guidance device 101, assistance device, environmental exploration device, an/or other such device. A guidance device 101 may be a device that detects information about the user's environment 100 and presents that information to the user to aid the user's 102 interaction with the environment 100.

As illustrated, the user 102 is holding the guidance device 101 in a hand 103 while walking down a street. The user 102 also is wearing a wearable device 109 and has a smart phone 108 in the user's pocket. A traffic signal 106 and a moving truck 107 are in front of the user 102 and another person 104 looking at a cellular telephone 105 is walking behind the user 102. The user 102 may be receiving tactile, audio, and/or other guidance output related to the environment 100 from the guidance device 101 (which may detect information regarding the environment 100 upon which the guidance output may be based) and/or the smart phone 108 and/or wearable device 109. For example, the user 102 may be receiving output that the user 102 is approaching the traffic signal 106, the truck 107 is approaching the user 102, the other person 104 is approaching the user 102 from behind, and so on. As illustrated, one or more of the shown devices may be wired and/or wirelessly transmitting and/or receiving in order to communicate with one or more of each other. Such devices may communicate with each other in order to obtain environmental or other sensor data regarding the environment, generate a model based on the sensor data, and provide the guidance output to the user 102 based on the model.

Although FIG. 1 is illustrated as providing tactile guidance output to the hand 103 of the user 102, it is understood that this is an example. In various implementations, tactile guidance output may be provided to various different parts of a user's body, such as a shirt made of a fabric configured to provide tactile output.

Figure 2:
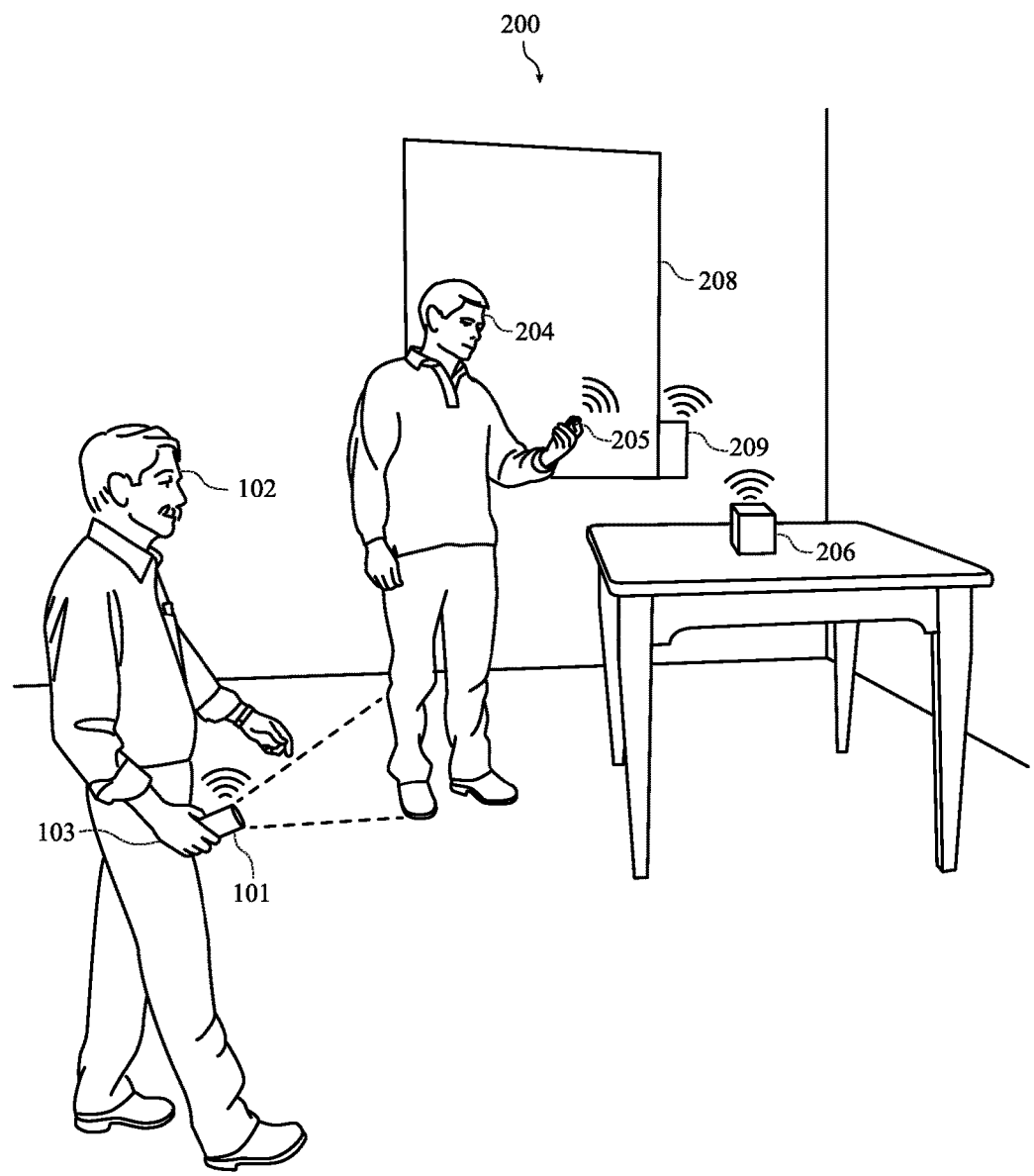
FIG. 2 shows the user navigating another example environment using the guidance device.

Similarly, FIG. 2 shows the user 102 navigating another example environment 200 using the guidance device 101. As illustrated, the user 102 is holding the guidance device 101 (which may detect information regarding the environment 200 upon which the guidance output may be based) in the user's hand 103 while walking through a room in a house. The room has a display screen 208 connected to a communication adapter 209 on a wall and a navigation beacon 206 on a table. Another person 204 looking at a smart phone 205 is also in the room. As illustrated, one or more of the devices, may be transmitting and/or receiving in order to communicate with one or more of each other. The user 102 may be receiving tactile, audio, and/or other guidance output related to the environment 200 from the guidance device 101. For example, the user 102 may be receiving tactile output of the layout of the room based on a map provided by the navigation beacon 206. By way of another example, the user 102 may be receiving tactile and/or audio direction indications associated with navigation from the user's 102 current location in the environment 200 to a destination input by the other person 204 on the smart phone 205, the guidance device 101, and/or the display screen 208.

Figure 3:
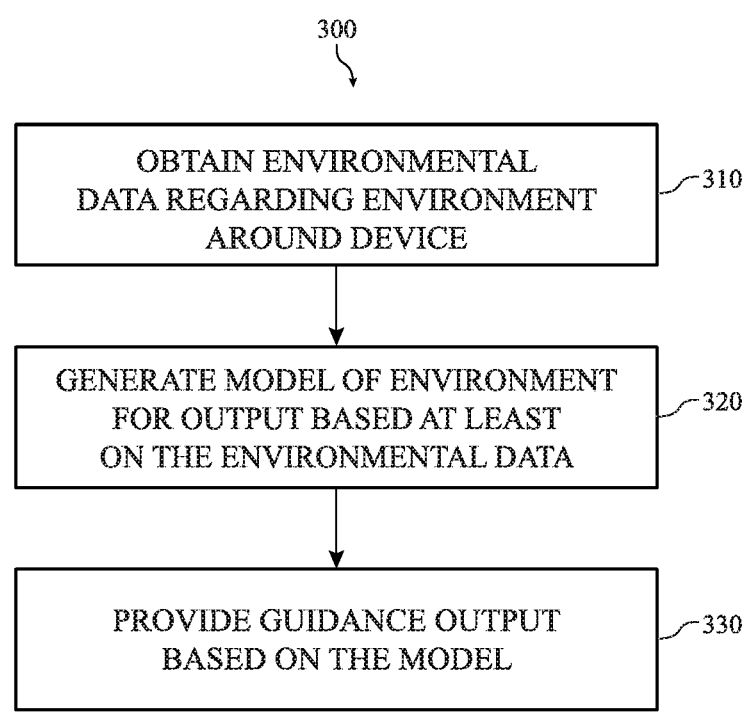
FIG. 3 shows a flow chart illustrating a method for providing guidance using a guidance device.

FIG. 3 shows a flow chart illustrating a method 300 for providing guidance using a guidance device. By way of example, such a guidance device may be one or more of the guidance devices 101, 501, 601, 701, or 801 illustrated and described herein with respect to FIGS. 1, 2, and 4-10.

At 310, environmental or other sensor data may be obtained regarding an environment around a guidance device. The environmental data may be obtained from a variety of different kind of sensors or other sensor data components such as image sensors (such as cameras, three-dimensional cameras, infra-red image sensors, lasers, ambient light detectors, and so on), positional sensors (such as accelerometers, gyroscopes, magnetometers, and so on), navigations systems (such as a global positioning system or other such system), depth sensors, microphones, temperature sensors, Hall effect sensors, and so on. In some implementations, one or more such sensors may be incorporated into the guidance device. In other implementations, one or more such sensors may be components of other electronic devices and the sensor of the guidance device may be a communication component that receives environmental data from such other sensors transmitted from another electronic device (which may communicate with the guidance device in one or more client/server configurations, peer-to-peer configurations, mesh configurations, and/or other communication network configurations). Such sensors may obtain environmental data regarding any aspect of an environment such as the presence and/or position of objects, the movement of objects, weather conditions, textures, temperatures, and/or any other information about the environment.

At 320, a model of the environment may be generated for guidance output based at least on the environmental data. As even the smallest environment may contain too much information to output or output in such a way that a user can make sense of it, the model may include a subset of the obtained environmental data. The environmental data may be processed in order to determine which of the environmental data is relevant enough to the user to be included in the model. Such processing may include image or object recognition and/or other analysis of environmental data. For example, an environment may contain a number of objects, but only the objects directly in front of, to the sides, and/or behind a user and/or particularly dangerous objects such as moving automobiles may be included in a model.

In some cases, the determination of whether to include environmental data in the model may be dependent on a current state of one or more output devices that will be used to present guidance output data for the model. For example, an input/output touch surface may be used to provide tactile output via a currently touched area. When a larger area of the input/output touch surface is being touched, more environmental data may be included in the generated model. Conversely, when a smaller area of the input/output touch surface is being touched, less environmental data may be included in the generated model.

The guidance device may generate the model. However, in various cases the guidance device may cooperate with one or more other electronic devices communicably connected (such as in various client/server configurations, peer-to-peer configurations, mesh configurations, and/or other communication network configurations) to the guidance device in order to generate the model. For example, the guidance device may generate the model by receiving a model generated by another device. By way of another example, another device may process the environmental data and provide the guidance device an intermediate subset of the environmental data which the guidance device then uses to generate the model.

At 330, guidance output based at least on the model may be provided. Such guidance output may be tactile output (such as shapes of objects, indications of positions or motions of objects, and so on), audio output (such as audio notifications related to and/or descriptions of objects or conditions in the environment and so on), and/or any other kind of output. Providing guidance output based on the model may include mapping the model to one or more output devices and providing the guidance output based at least on the mapping via the output device(s).

For example, an input/output touch surface may be used to provide tactile guidance output via an area currently being touched by a user's hand. The area currently being touched by the user's hand may be determined along with the orientation of the user's hand touching the area and the model may be mapped to the determined area and orientation. Tactile output may then be provided via the input/output touch surface according to the mapping. In such a case, the tactile output may be mapped in such a way as to convey shapes and/or textures of one or more objects, information about objects (such as position in the environment, distance, movement, speed of movement, and/or any other such information) via the position on the input/output touch surface (such as where the output is provided in relation to various portions of the user's hand) and/or other contextual indicators presented via the input/output touch surface, and/or other such information about the environment.

By mapping guidance output to the area currently being touched by a user's hand, power savings may be achieved as output may not be provided via areas of the input/output touch surface that are not capable of being felt by a user. Further, mapping guidance output to the area currently being touched by a user's hand, assistance may be provided to the user to ensure that the output is provided to portions of the user's hand as expected by the user as opposed to making the user discover how to touch the guidance device in a particular manner.

In some implementations, determination of the area currently being touched by a user's hand may include determining details about the user's hand and the guidance output may be mapped according to such details. For example, the details may include that the hand is a left hand of the user, a right hand of the user, has a large palm size, has a small palm size, has less than four fingers, or does not have a thumb.

The guidance device may provide the guidance output via one or more output components of the guidance device such as one or more input/output touch surface, speakers, and/or other output devices. However, in some cases the guidance device may cooperate with one or more other electronic devices communicably connected (such as in various client/server configurations, peer-to-peer configurations, mesh configurations, and/or other communication network configurations) to provide one or more kinds of output.

For example, a guidance device may provide a pattern of raised bumps or other such protrusions to indicate objects in the environment, the identity of the objects, the position of those objects, and the distance of those objects to the user. A wearable device on the user's wrist may also provide vibration output to indicate that one or more of the objects are moving towards the user. Further, the user's cellular telephone may output audio directions associated with navigation of the user from the user's current location (such current location information may be detected by one or more sensors such as a global positioning system or other navigation component) to a destination.

Although the example method 300 is illustrated and described as including particular operations performed in a particular order, it is understood that this is an example. In various implementations, various orders of the same, similar, and/or different operations may be performed without departing from the scope of the present disclosure.

For example, although the method 300 is illustrated and described as generating a model based on the environmental data and providing guidance output based on the model, it is understood that this is an example. In some implementations, guidance output may be provided based on environmental data without generating a model. In one example of such a scenario, the guidance device may detect that the guidance device was held and then dropped using one or more positional sensors, input/output touch surface, and/or other such components. In such a case, the guidance device may emit an audio alarm upon such detection without generation of a model to aid a user in locating the dropped guidance device.

Figure 4A:
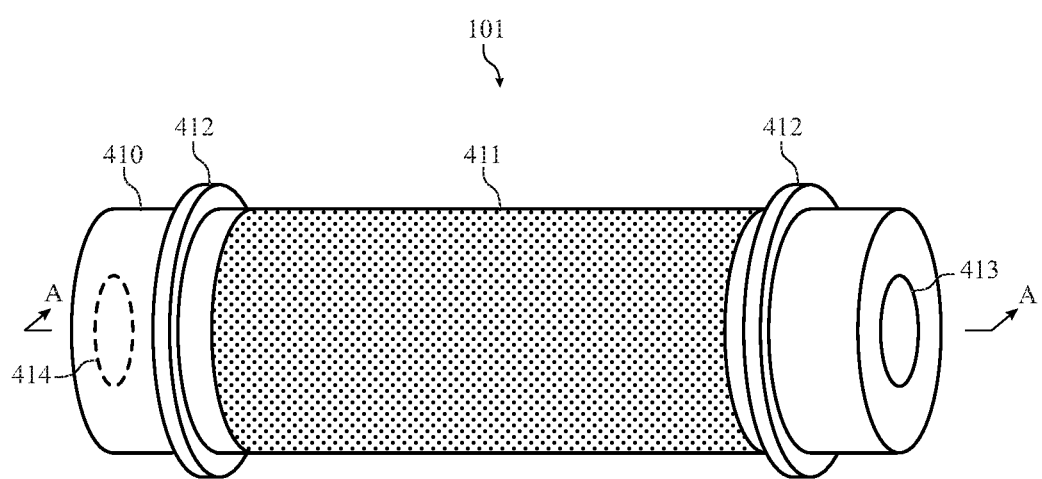
FIG. 4A shows an isometric view of an example guidance device.

FIG. 4A shows an isometric view of an example guidance device 101. The guidance device 101 may include a cylindrical housing 410 that may be formed of aluminum, plastic, and/or any other suitable material. An input/output touch surface 411 may be disposed on a surface of the cylindrical housing 410. The input/output touch surface 411 may be operable to detect touch input (such as touch, force, pressure and so on via one or more capacitive sensors, touch sensors, and/or any other kind of touch and/or force sensors). The input/output touch surface 411 may also be operable to provide tactile output, such as one or more patterns of vibrations, raised bumps or other protrusions, and so on. For example, the input/output touch surface 411 may include one or more piezoelectric cells that can be electrically manipulated to create one or more patterns of raised bumps on the input/output touch surface 411.

The guidance device 101 may also include image sensors 413 and 414. The image sensors 413 and 414 may be any kind of image sensors such as one or more cameras, three dimensional cameras, infra-red image sensors, lasers, ambient light detectors, and so on.

The guidance device 101 may also include one or more protectors 412 that may prevent the input/output touch surface 411 from contacting surfaces with which the guidance device 101 comes into contact. The protectors 412 may be formed of rubber, silicone, plastic, and/or any other suitable material. As illustrated, the protectors 412 may be configured as rings. In such a case, the guidance device 101 may include one or more weights and/or other orientation elements (discussed further below) to prevent the guidance device 101 from rolling when placed on a surface. However, in other cases the protectors 412 may be shaped in other configurations (such as with a flat bottom) to prevent rolling of the guidance device 101 on a surface without use of a weight or other orientation element.

As shown, the cylindrical housing 410 is shaped such that it may be held in any number of different orientations. To accommodate for such different holding orientations, the guidance device 101 may utilize the input/output touch surface 411, one or more position sensors, and/or other components to detect orientation information regarding the orientation in which the guidance device 101 is being held in order to map output to output devices such as the input/output touch surface 411 accordingly. However, in other implementations the guidance device 101 may have a housing shaped to be held in a particular manner, such as where a housing is configured with a grip that conforms to a user's hand in a particular orientation. In such an implementation, detection of how the guidance device 101 is being held may be omitted while still allowing the guidance device 101 to correctly map output to output devices such as the input/output touch surface 411.

In some cases, the guidance device 101 may be configured to operate in a particular orientation. For example, the image sensor 413 may be configured as a front image sensor and the image sensor 414 may be configured as a rear image sensor. This may simplify analysis of environmental and/or sensor data from the image sensors 413 and 414. This may also allow for particular configurations of the image sensors 413 and 414, such as where the image sensor 413 is a wider angle image sensor than the image sensor 414 as a user may be more concerned with objects in front of the user than behind.

However, in other cases the guidance device 101 may be configurable to operate in a variety of orientations. For example, the image sensors 413 and 414 may be identical and the guidance device 101 may use the image sensors 413 and 414 based on a currently detected orientation (which may be based on detection by input/output touch surface 411, one or more positional sensors, and/or other such components).

Figure 4B:
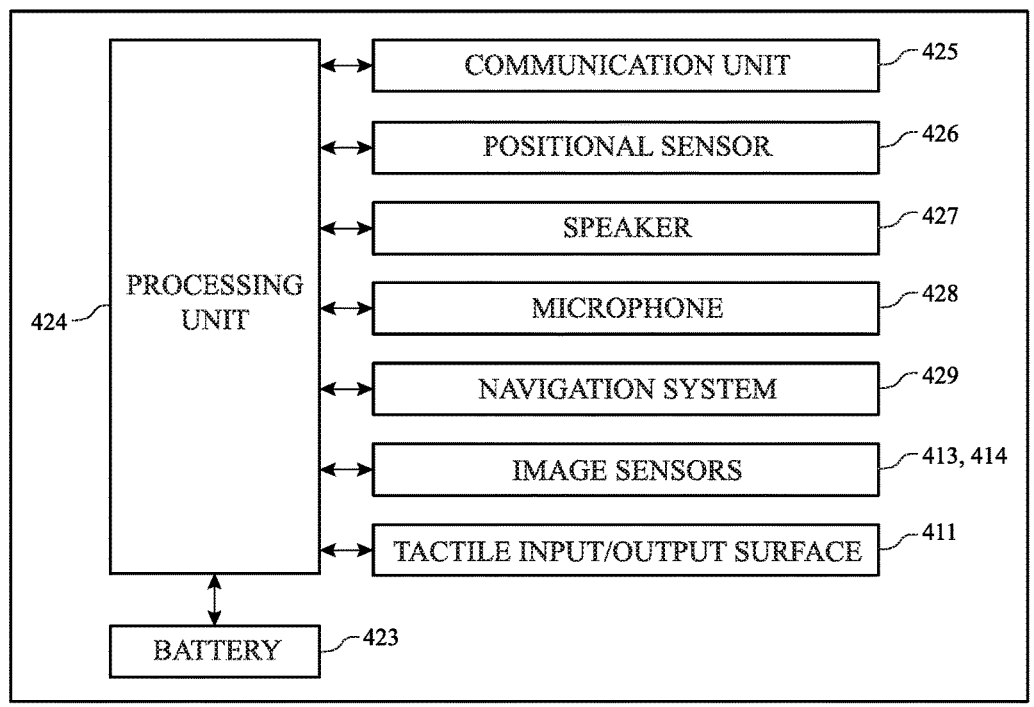
FIG. 4B shows a block diagram illustrating functional relationships of example components of the guidance device of FIG. 4A.

FIG. 4B shows a block diagram illustrating functional relationships of example components of the guidance device 101 of FIG. 4A. As shown, in various example implementations the guidance device 101 may include one or more processing units 424, batteries 423, communication units 425, positional sensors 426, speakers 427, microphones 428, navigation systems 429, image sensors 413 and 414, tactile input/output surfaces 411, and so on. The guidance device 101 may also include one or more additional components not shown, such as one or more non-transitory storage media (which may take the form of, but is not limited to, a magnetic storage medium; optical storage medium; magneto-optical storage medium; read only memory; random access memory; erasable programmable memory; flash memory; and so on).

The processing unit 424 may be configured such that the guidance device 101 is able to perform a variety of different functions. One such example may be the method 300 illustrated and described above with respect to FIG. 3. The processing unit 424 may also be configured such that the guidance device 101 is able to receive a variety of different input and/or provide a variety of different output. For example, the guidance device 101 may be operable to receive input via the communication unit 425, the positional sensors 426 (such as by shaking or other motion of the guidance device 101), the microphone 428 (such as voice or other audio commands), the tactile input/output touch surface 411, and so on. By way of another example, the guidance device 101 may be operable to provide output via the communication unit 425, speaker 427 (such as speech or other audio output), the tactile input/output touch surface 411, and so on.

The tactile input/output touch surface 411 may be configured in a variety of different ways in a variety of different implementations such that it is operable to detect touch (or force, pressure, and so on) and/or provide tactile output. In some implementations, the tactile input/output touch surface 411 may include touch sensing device layer and a haptic device layer. Such touch sensing device and a haptic device layers may be positioned adjacent to each other.

Figure 4C:
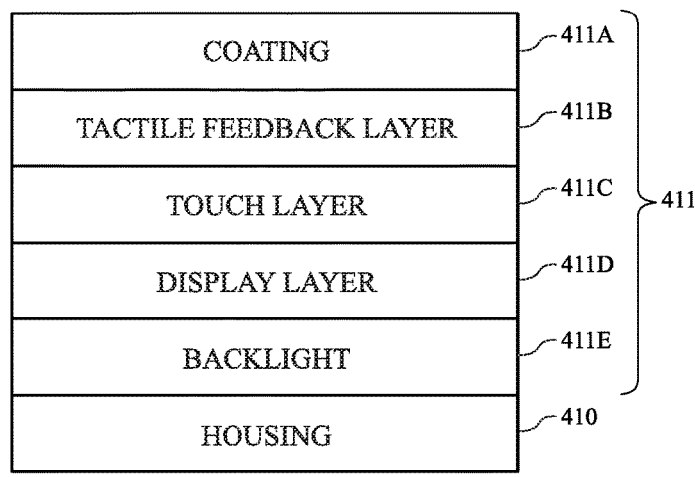
FIG. 4C shows a diagram illustrating an example configuration of the input/output touch surface of the guidance device of FIG. 4A.

For example, FIG. 4C shows a diagram illustrating an example configuration of the input/output touch surface 411. As shown, the input/output touch surface 411 may be positioned on the housing 410. The input/output touch surface 411 may include a number of layers such as a tactile feedback layer 411B (such as piezoelectric cells, vibration actuators, and so on) and a touch layer 411C (such as a capacitive touch sensing layer, a resistive touch sensing layer, and so on). The input/output touch surface 411 may also include a coating 411A (which may be formed of plastic or other material that may be more flexible than materials such as glass), which may function to protect the input/output touch surface 411.

As shown, in some implementations the input/output touch surface 411 may include a display layer 411D. A vision impaired user may not be completely blind and as such visual output may be presented to him via the display layer 411D. Further, in some cases visual output may be presented via the display layer 411D to another person who is assisting the user of the guidance device 101, such as where the other person is being presented visual output so the other person can input a destination for the user to which the guidance device 101 may then guide the user.

In some implementations, such as implementations where the display layer 411D is a display that utilizes a backlight, the input/output touch surface 411 may include a backlight layer 411E.

In various implementations, the input/output touch surface 411 (and/or other components of the guidance device 101) may be operable to detect one or more biometrics of the user, such as a fingerprint, palm print and so on. For example, a user's fingerprint may be detected using a capacitive or other touch sensing device of the input/output touch surface 411.

Such a biometric may be used to authenticate the user. In some situations, entering a password or other authentication mechanism may be more difficult for a sensory impaired user than for other users. In such a situation, using a detected biometric for authentication purposes may make authentication processes easier for the user.

Figure 5A:
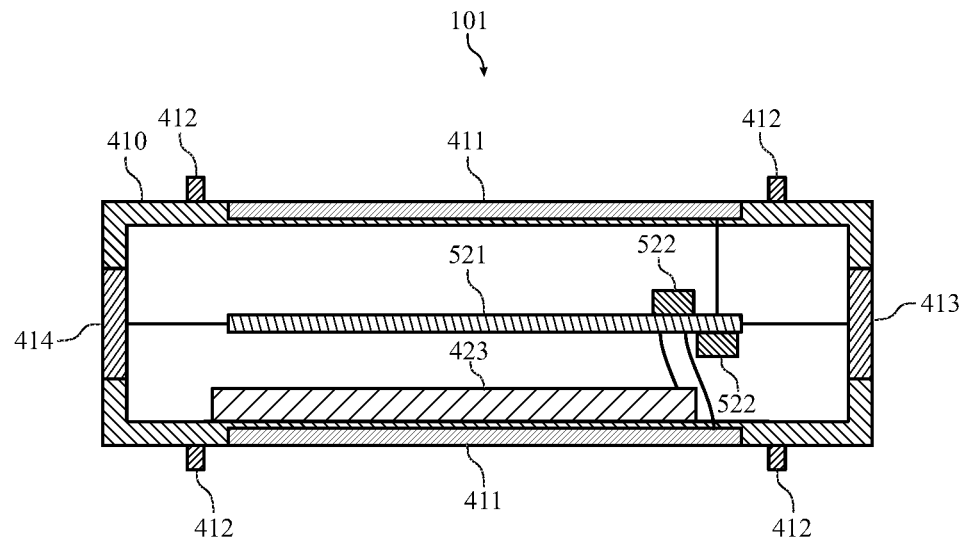
FIG. 5A shows a cross-sectional view of the example guidance device of FIG. 4A, taken along line A-A of FIG. 4A.
Figure 5B:
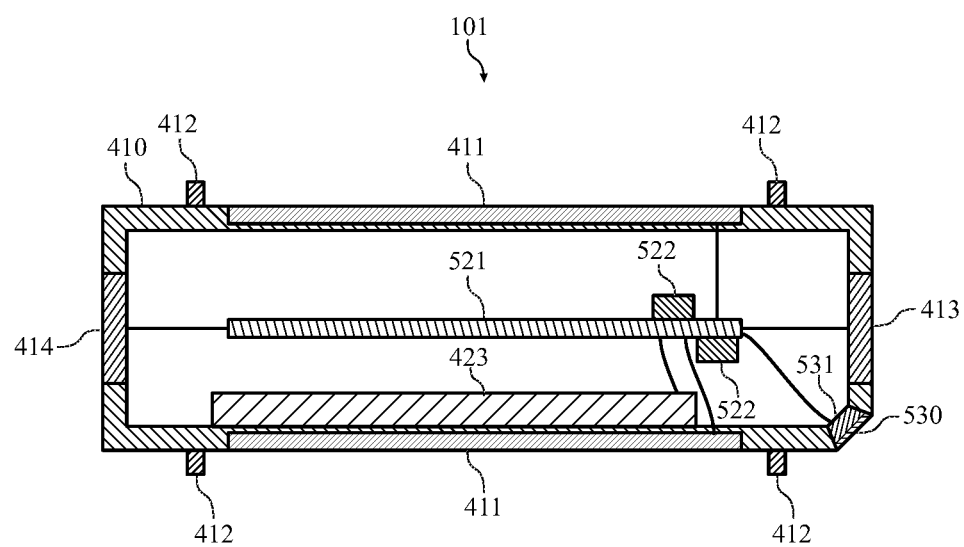
FIG. 5B shows a cross-sectional view of another example of the guidance device of FIG. 4A in accordance with further embodiments of the present disclosure.

FIG. 5A shows a cross-sectional view of the example guidance device 101 of FIG. 4A, taken along line A-A of FIG. 4A. As illustrated, the guidance device 101 may include a printed circuit board 521 (and/or other electronic module) with one or more connected electronic components 522 disposed on one or more surfaces thereon. Such electronic components 522 may include one or more processing units, wired and/or wireless communication units, positional sensors, input/output units (such as one or more cameras, speakers or other audio components, microphones, and so on) navigation systems, and/or any other electronic component. The printed circuit board 521 may be electrically connected to the input/output touch surface 411, the image sensors 413 and 414, one or more batteries 423 and/or other power sources, and so on.

As illustrated, the battery 423 may be configured as a weight at a "bottom" of the guidance device 101. This may operate to orient the guidance device 101 as shown when the guidance device 101 is resting on a surface instead of being held by a user. As such, the battery 423 may prevent the guidance device 101 from rolling.

Although FIG. 5A illustrates a particular configuration of components, it is understood that this is an example. In other implementations of the guidance device 101, other configurations of the same, similar, and/or different components are possible without departing from the scope of the present disclosure.

For example, in one implementation of the guidance device 101 of FIG. 5A, the image sensor 413 may be a wide angle image sensor configured as a front image sensor. However, in another implementation shown in FIG. 5B, image sensor 413 may be a narrow angle image sensor configured as a front image sensor. To compensate for the narrow angle of the image sensor 413, one or more additional image sensors 530 may be used.

As shown in this example, the additional image sensor 530 may be located at a bottom corner of the cylindrical housing 410. The additional image sensor 530 may be maneuverable via a motor 531 and/or other movement mechanism. In this example, the additional image sensor 530 may be rotatable via the motor 531 such that it can be operated to obtain image sensor data of an area around the user's feet in order to compensate for a narrow angle image sensor used for the image sensor 413. In other examples, a similar image sensor/motor mechanism may be located at a top corner of the cylindrical housing 410 in order to obtain image sensor data of an area above the user's head.

By way of another example, in various implementations, one or more ends of the cylindrical housing 410 may be configured with flanges and/or other structures that project from the ends of the cylindrical housing 410. Such flanges and/or other structures may protect the image sensors 413 and/or 414 from damage.

Figure 6A:
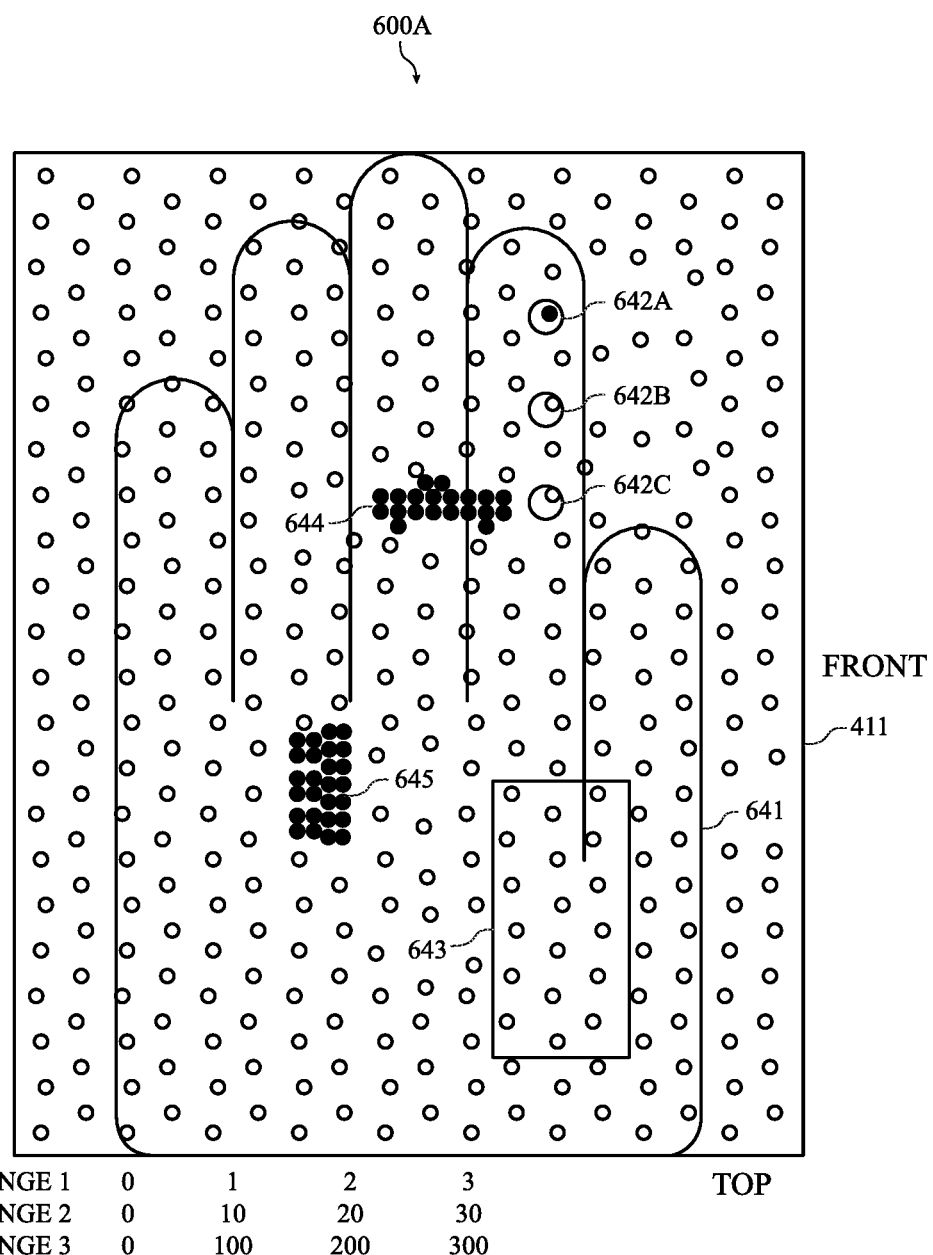
FIG. 6A shows a diagram illustrating an example of how a model of an environment generated based on environmental data may be mapped to the input/output touch surface of the guidance device of FIG. 5A.

FIG. 6A shows a diagram illustrating an example 600A of how a model of an environment generated based on environmental data may be mapped to the input/output touch surface 411 of the guidance device of FIG. 5A. For purposes of clarity, the input/output touch surface 411 is shown as unrolled and is marked to indicate what the guidance device 101 may have detected as the top and front of the input/output touch surface 411 is based on a current orientation in which a user is holding the guidance device 101. The hand 641 indicates an area of the input/output touch surface 411 where a user's hand has been detected as currently touching the input/output touch surface 411. In this example, the input/output touch surface 411 is providing tactile output indicating information about a model generated based on environmental data regarding the environment 100 shown in FIG. 1.

The input/output touch surface 411 may include a number of bumps that can be raised or not to indicate input, such as via piezoelectric cells. As illustrated, filled bumps indicate raised bumps and unfilled bumps indicate bumps that are not raised.

The input/output touch surface 411 may provide tactile output via the raised bumps to indicate shapes or textures of objects in the environment. For example, the raised bumps 644 indicate the shape of the truck 107 in the environment 100 of FIG. 1 and the raised bumps 645 indicate the shape of the traffic signal 106 in the environment 100 of FIG. 1. The user may be able to feel the shapes of the raised bumps 644 and 645 and understand that the truck 107 and traffic signal 106 are present.

The region in which tactile output is provided on the input/output touch surface 411 via the raised bumps may correspond to positional information regarding objects in the environment. Further, the relationships between raised bumps in various regions may correspond to relationships in the positions of the corresponding objects in the environment. For example, the raised bumps 645 are illustrated as further to the left on the input/output touch surface 411 than the raised bumps 644. This may correspond to the fact that the traffic signal 106 is closer to the user 102 in the environment 100 of FIG. 1 than the truck 107.

The tactile output may also include a variety of different context indicators. As described above the regions in which tactile output is provided on the input/output touch surface 411 via the raised bumps may correspond to positional information regarding objects in the environment. However, in some implementations the positional information indicated by the regions may be dependent on a context indicator presented via tactile output via the input/output touch surface 411 and/or otherwise presented, such as where the positional information is first positional information when a first positional context indicator is provided and is second positional information when a second positional context indicator is provided.

For example, FIG. 6A illustrates a series of ranges "Range 1," "Range 2," and "Range 3." Each range maps an area of the input/output touch surface 411 touched by the user's hand as indicate by the hand 641 to a distance range. As illustrated, range 1 maps the pinky finger of the hand 641 to a distance of 0 meters, the ring finger to a distance of 1 meter, and the middle finger to a distance of 3 meters. Range 2 maps the pinky finger of the hand 641 to a distance of 0 meters, the ring finger to a distance of 10 meters, and the middle finger to a distance of 30 meters. Range 3 maps the pinky finger of the hand 641 to a distance of 0 meters, the ring finger to a distance of 100 meters, and the middle finger to a distance of 300 meters. Regions 642A-C may be range context indicators that indicate via tactile output which of the ranges is being currently presented. In this example, 642A may indicate Range 1, 642B may indicate Range 2, and 643C may indicate Range 3. By making the interpretation of information corresponding to region dependent on such content indicators, a wider variety of information may be presented via the input/output touch surface 411 while still being comprehensible to a user.

As shown, a bump is raised for 642A. This indicates in this example that Range 1 is currently being used. Thus, the traffic signal 106 is indicated by the raised bumps 645 as being 2 meters from the user and the truck 107 is indicated by the raised bumps 644 as being 3 meters from the user.

In various implementations, a variety of other kind of information may be presented. For example, the raised bump(s) of the regions 642A-C indicating the range current being used may be alternatingly raised and lowered to create the sensation that the context indicator is being "flashed." This may indicate that one or more of the objects are moving. In some implementations the raised bumps 644 and/or 645 may be similarly raised and lowered to create the sensation of flashing to indicate that the respective object is moving. In some cases, the speed of the flashing may correspond to the speed of the movement.

By way of another example, a zone 643 may present tactile output related to one or more alerts to which the user's attention is specially directed. In some cases, the zone 643 may present indications of objects above the user's head, objects at the user's feet, the height of an object in the environment, the fact that that an object is traveling in a course that will connect with a user (which may be determined using real time calculations), the fact that the user is approaching the object and the object is below a head height of the user, and so on. In other cases, other alerts may be provided via the zone 643, such as raising and lowering bumps in the zone 643 to indicate that an object is moving toward the user at high speed. Various configurations are possible and contemplated without departing from the scope of the present disclosure.

Although this example illustrates objects that are in front of the user without illustrating objects that are behind the user, it is understood that this is an example and that various depictions of an environment may be presented. For example, in some implementations one portion of the input/output touch surface 411 may correspond to objects located in the user's direction of travel while another portion corresponds to objects located in the opposite direction.

Figure 6B:
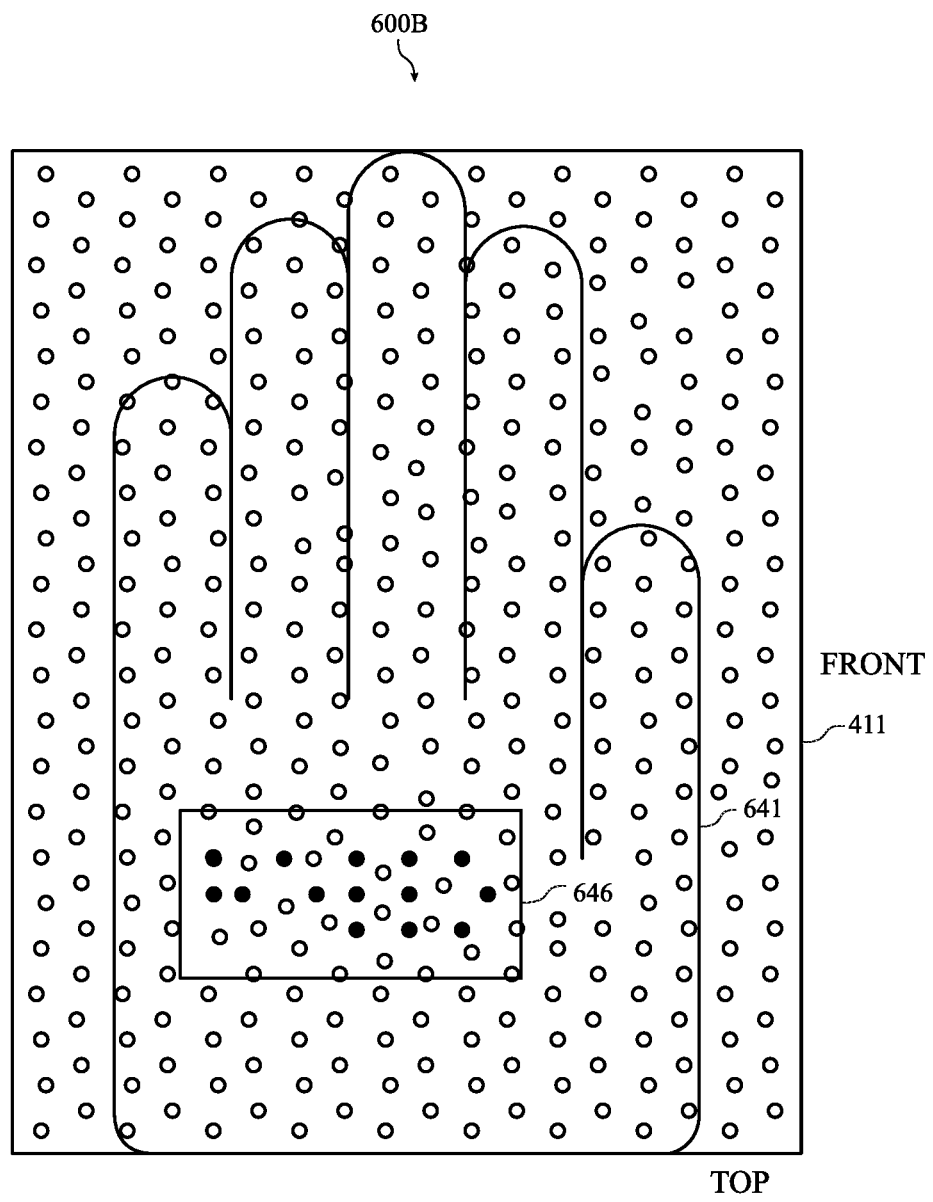
FIG. 6B shows a diagram illustrating another example of how a model of an environment generated based on environmental data may be mapped to the input/output touch surface of the guidance device of FIG. 5A.

FIG. 6B shows a diagram illustrating another example 600B of how a model of an environment generated based on environmental data may be mapped to the input/output touch surface 411 of the guidance device 101 of FIG. 5A. In this example, an area 646 of the input/output touch surface 411 may provide tactile output related to detected speech in an environment. For example, a microphone or other sound component of the guidance device 101 may be used to detect one or more words spoken in the environment. The guidance device 101 may perform voice to text speech recognition on the detected spoken words and provide a tactile output presenting the text in the area 646. For example, as illustrated the detected speech may be presented in braille via raised bumps in the area 646.

Figure 7:
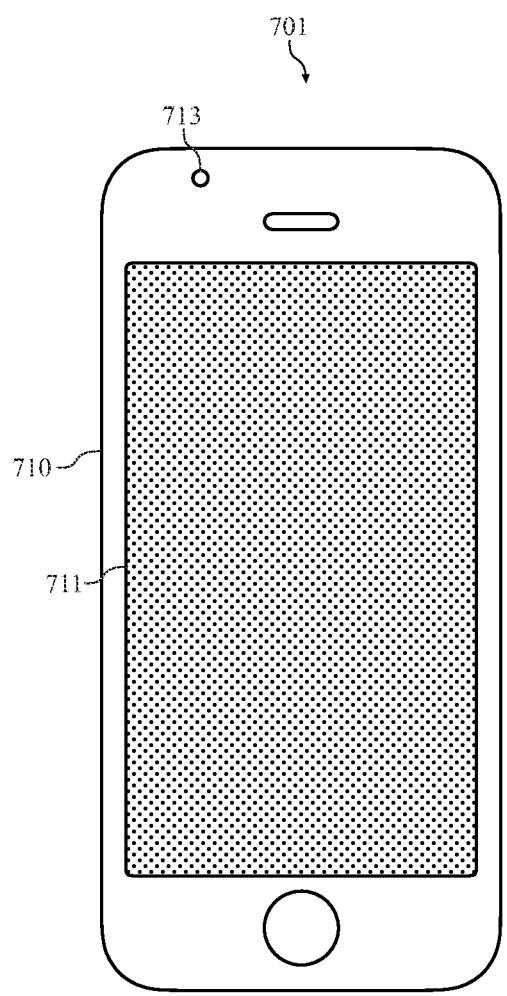
FIGS. 7-10 show additional examples of guidance devices.

FIG. 7 shows an additional example of a guidance device 701. The guidance device 701 may be a smart phone with a housing 710, one or more cameras 713 or other sensors, an input/output touch display screen surface 711 (that may include a touch sensing device to detect touch and a haptic device to provide tactile output), and/or various other components. The smart phone may provide guidance to a user by performing a method such as the method 300 illustrated and described above. A user may place a hand on the input/output touch display screen surface 711 in order to feel tactile output related to guidance.

Figure 8:
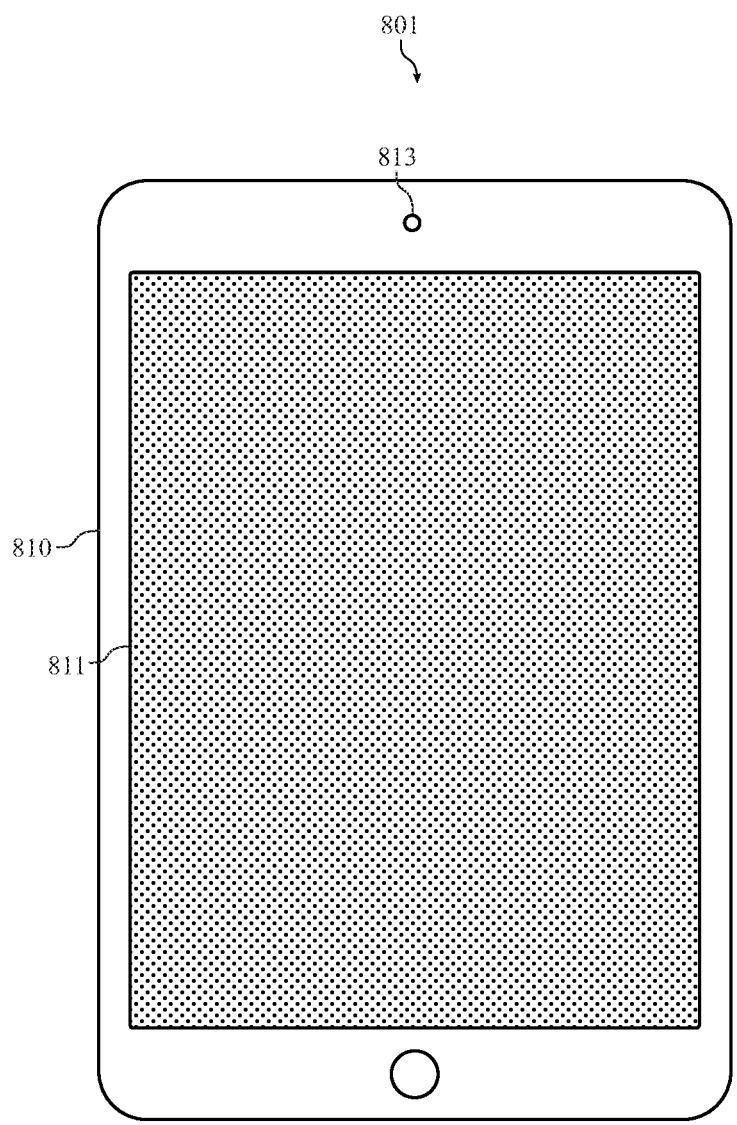

FIG. 8 shows another example of a guidance device 801. The guidance device 801 may be a tablet computing device. Similar to the smart phone of FIG. 7, the tablet computing device may include a housing 810, one or more cameras 813 or other sensors, an input/output touch display screen surface 811, and/or various other components. The tablet computing device may provide guidance to a user by performing a method such as the method 300 illustrated and described above. As the input/output touch display screen surface 811 is larger than the input/output touch display screen surface 711, placement of a hand on the input/output touch display screen surface 811 in order to receive tactile output related to guidance may be more comfortable and may be capable of providing more tactile information than the guidance device 701.

Figure 9:
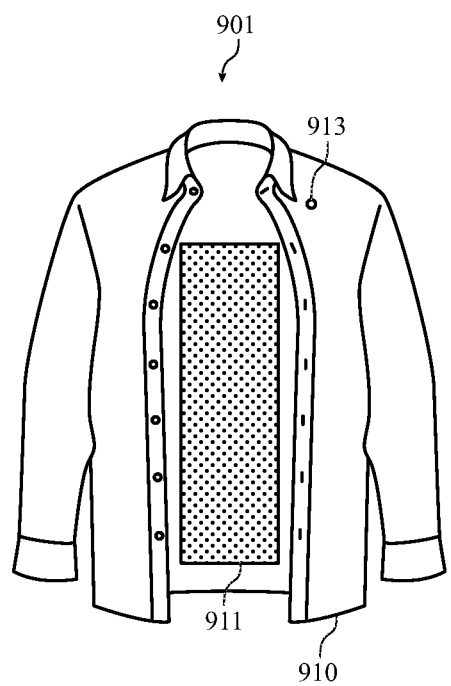

FIG. 9 shows yet another example of a guidance device 901. The guidance device 901 may be an item of apparel. Similar to the smart phone of FIG. 7 and the tablet computing device of FIG. 8, the item of apparel may include a housing 910, one or more cameras 913 or other sensors, an input/output touch surface 911, and/or various other components. The item of apparel may provide guidance to a user by performing a method such as the method 300 illustrated and described above. As shown, the input/output touch surface 911 may be in contact with a user's back when the item of apparel is worn. Thus, the user may feel tactile output related to guidance provided by the item of apparel without other people being able to visibly detect that the user is receiving guidance.

Figure 10:
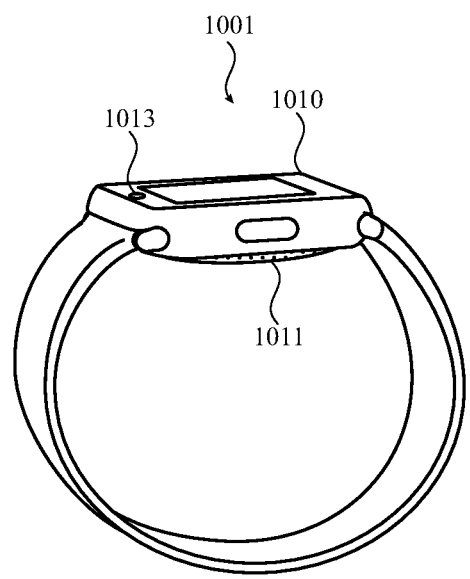

FIG. 10 shows still another example of a guidance device 1001. The guidance device 1001 may be a smart watch and/or other wearable device. Similar to the smart phone of FIG. 7, the tablet computing device of FIG. 8, and the item of apparel of FIG. 9, the smart watch may include a housing 1010, one or more cameras 1013 or other sensors, an input/output touch surface 1011, and/or various other components. The smart watch may provide guidance to a user by performing a method such as the method 300 illustrated and described above. As shown, the input/output touch surface 1011 may be in contact with a user's wrist when the smart watch is attached. Thus, the user may feel tactile output related to guidance provided by the smart watch in a hands free manner.

As described above and illustrated in the accompanying figures, the present disclosure relates to guidance devices for sensory impaired users. Sensor data may be obtained regarding an environment around a guidance device, assistance device, environmental exploration device, an/or other such device. A model of the environment may be generated based on the data. The model may be mapped at least to an input/output touch surface of the guidance device. Tactile output may be provided to a user of the guidance device via the input/output touch surface based at least on the mapping. Other output based on the model may also be provided. In this way, a sensory impaired user may be able to navigate and/or interact with an environment utilizing the guidance device. Such a guidance device may provide better assistance than and/or take the place of a cane, a guidance animal, and/or other guidance devices and/or relationships.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
an enclosure;
a tactile feedback layer positioned in the enclosure and configured to provide tactile output at an input/output surface;
a display layer positioned in the enclosure and configured to provide visual output through the input/output surface;
a sensor positioned within the enclosure and configured to sense an object within an external environment; and
a processing unit, operably coupled to the sensor, wherein:
the processing unit is configured to determine an estimated location of the object within the external environment based on an output of the sensor; and
the processing unit is configured to cause the tactile feedback layer to generate the tactile output, the tactile output including a representation that corresponds to the estimated location of the object.

2. The electronic device of claim 1, wherein the tactile feedback layer is operable to provide the tactile output by raising portions of the input/output surface.

3. The electronic device of claim 1, wherein the display layer provides the representation along a region of the input/output surface that corresponds to the estimated location of the object with respect to an orientation and position of the electronic device.

4. The electronic device of claim 1, wherein a shape of the representation corresponds to a shape of the object.

5. The electronic device of claim 1, wherein the sensor is an image sensor.

6. The electronic device of claim 1, wherein the sensor senses the object using another electronic device that is separate from the electronic device.

7. The electronic device of claim 1, wherein the electronic device comprises a smart watch.

8. An electronic device, comprising:
an enclosure defining a surface operable to receive a touch input;
a sensor configured to sense an object positioned within an environment; and
a processing unit operably coupled to the sensor; wherein:
the processing unit is configured to detect the touch input along a portion of the surface being touched;
in response to detecting the touch input, the processing unit is configured to cause the portion of the surface to generate a tactile output; and
the tactile output includes a representation that corresponds to the object sensed using the sensor.

9. The electronic device of claim 8, wherein:
the electronic device further comprises an orientation sensor that is configured to detect an orientation of the electronic device; and
a location of the representation along the surface changes in accordance with a change in the orientation of the electronic device.

10. The electronic device of claim 8, wherein the representation includes a direction indication that corresponds to a navigation direction to a destination.

11. The electronic device of claim 8, wherein the electronic device comprises a display screen positioned below the surface.

12. The electronic device of claim 8, wherein the tactile output includes:
a first representation of a first object located in a first position with respect to the electronic device; and
a second representation of a second object located in a second position with respect to the electronic device.

13. The electronic device of claim 12, wherein:
the first representation indicates that a movement of the electronic device is in a direction of travel toward the first object.

14. The electronic device of claim 13, wherein:
the second representation indicates that the direction of travel is away from the second object.

15. An electronic device, comprising:
a housing;
a sensor configured to sense an external environment;
a processing unit positioned within the housing;
a haptic device operably coupled to the processing unit and configured to produce a haptic output along a portion of an external surface of the electronic device; and
a touch sensing device;
wherein:
the processing unit is configured to determine details of a hand of a user that is touching the touch sensing device, the processing unit is configured to cause the haptic device to produce the haptic output; and
the haptic output comprises an output image that corresponds to a portion of the external environment sensed by the sensor, the haptic output being provided in accordance with the details of the hand of the user.

16. The electronic device of claim 15, wherein:
the output image includes a two-dimensional representation of the portion of the external environment.

17. The electronic device of claim 15, wherein the haptic device comprises at least one of piezoelectric cells or vibration actuators.

18. The electronic device of claim 15, wherein the haptic device is operable to provide the haptic output as a number of raised bumps.

19. The electronic device of claim 15, wherein the details of the hand include:
a location where the hand is touching the touch sensing device;
whether the hand is a left hand;
whether the hand is a right hand; or
a palm size of the hand.

* * * * *